3,155,706
PRODUCTION OF DIARYL PHOSPHATES
Vasco G. Camacho and Wendell M. Byrd, Jr., Richmond, Va., assignors to Socony Mobil Oil Company, Inc., a corporation of New York
No Drawing. Filed July 26, 1961, Ser. No. 126,868
13 Claims. (Cl. 260—461)

This invention relates to an improved process for the manufacture of diaryl esters of ortho-phosphoric acid. Specifically, it relates to a new process for the manufacture of diaryl phosphates of the formula $$(RO)_2P(O)OH$$

wherein R is a member of the group consisting of phenyl, lower alkoxy-substituted phenyl, alkyl-substituted phenyl wherein the alkyl group contains from 1 to 9 carbon atoms, halo-substituted phenyl and nitro-substituted phenyl.

There are known methods for the production of diesters of phosphoric acid. None of these methods, however, are completely acceptable for the commercial production of diaryl phosphates. A common procedure involves the reaction of three molecular proportions of a phenol with one molecular proportion of $P_2O_5$ to form, theoretically, equimolar quantities of diesters, with subsequent separation of the esters. There are, however, several reasons why the process is objectionable. Although the process can be economical, mainly because of the low cost of starting materials, the various mixed esters cannot always be separated with equal ease. In some cases, separation is so involved and yields of desired product so low that the method ceases to be of any value. Furthermore, it is never possible in actual practice to obtain the ideal 50–50 monoester-diester mixture. Some phenols react with $P_2O_5$ to form a mixture close to the ideal, but generally substantial amounts of triester, pyrophosphates and even phosphoric acid are formed, the latter especially in the presence of water. These contaminants further complicate efforts to obtain a pure product from the mixture. Finally, most separation methods are such that it is impractical, sometimes impossible, to recover each component of the mixture. Although essentially all of the diester can be recovered from a $P_2O_5$-phenol reaction mixture, the other main portion is lost, with the consequent loss of phosphorus contained therein.

Another widely reported method involves the reaction of two molecular proportions of a phenol with one molecular proportion of $POCl_3$, separation of the chlorides and subsequent hydrolysis of the diaryl phosphorochloridate. This method could afford the easiest route to diesters of phosphoric acid if the reaction between phenol and $POCl_3$ in a 2:1 ratio were a simple one. Unfortunately, the reaction $$2ROH + POCl_3 \rightarrow (RO)_2P(O)Cl \qquad (1)$$

does not proceed quantitatively, nor even acceptably in a commercial sense, using presently known methods. Instead of progressing simply as shown by Formula 1, essentially all theoretically possible combinations are present. The following equations show other ways in which it actually proceeds:

$$ROH + POCl_3 \rightarrow ROP(O)Cl_2 + HCl \qquad (2)$$
$$3ROH + POCl_3 \rightarrow (RO)_3PO + HCl \qquad (3)$$

One has, instead of the simple monochloro compound, a mixture of all possible products, plus some starting material. It will be evident to one skilled in this art that separation to obtain the desired dichloride is difficult. It is difficult enough when alkyl groups are attached to phosphorus; aryl groups present the added complications of high boiling points and, upon attempted distillation, decomposition of desired phosphorochloridate from excessive heating.

Diaryl phosphates may also be prepared by reacting one molecular proportion of an alcohol, preferably of low molecular weight, with an excess of $POCl_3$, removing the excess $POCl_3$ and distilling the dichloride, reacting the dichloride thus obtained with two molecular proportions of a phenol and subjecting the alkyl diaryl phosphate to mild hydrolysis to remove the alkyl group. The obvious objectionable feature of this process is that it is difficult to control the hydrolysis step so that only the alkyl group is removed. Also, since the cost of a process varies directly with the number of steps involved, the use of this method would be exceedingly costly in view of the number of steps required to produce the finished product. Furthermore, the purified dichloride is subject to decomposition at the relatively high temperatures required to cause the reaction between it and phenols to proceed essentially quantitatively. U.S. Patent 2,504,121 gives a good account of typical relationships that exist between the boiling point and the decomposition temperature range of various alkyl phosphorodichloridates.

Kosolapoff (Organo-Phosphorus Compounds (1958), p. 232) reports that sodium salts of diesters of phosphoric acid can be prepared by hydrolysing a tiester of phosphoric acid with alkali metal hydroxide or a dilute mineral acid. Alkaline solutions are useful especially in the aliphatic series provided that the radicals are moderately large. Aryl groups and increased aliphatic radical size rapidly increase hydrolysis resistance, however. Acidic hydrolysis is more difficult to control, and generally progressive degradation products, down to phosphoric acid, are formed. Further, neither method is general. Thus, although selective removal of one group may be performed, the condition for removal must be found experimentally in each case.

A review of the art as it now exists shows that there is no simple, economically feasible method for producing diaryl phosphates commercially. For example, it is obvious that every method outlined is subject to the disadvantage that considerable quantities of impurities are produced, thus necessitating expensive purification procedures. Even the most promising procedure (hydrolysis of a diaryl phosphorochloridate) is, in its present state of development, out of the question because of the erratic nature of the initial phenol-$POCl_3$ reaction.

It is therefore an object of this invention to provide an improved process for the production of diaryl phosphates.

A further object of this invention is to provide a simple, economically feasible process for the production of diaryl phosphates of high purity.

Another object of this invention is to provide a new process for producing diaryl phosphates in excellent yields and purities by a synthesis which is essentially a one-step process.

In attaining the objects of this invention, one feature resides in maintaining the pH of the reaction mixture of phosphorus oxyhalide and an alkali metal phenoxide within a critical range to assure the production of a major proportion of the diaryl phosphate. Another feature resides in the particular methods of contacting the reactants to maintain the pH within the desired range, thereby attaining high yields of diaryl phosphorohalidates and, subsequently, of diaryl phosphates.

Other objects, features and advantages of this invention will become apparent from the remainder of the disclosure and the claims.

As stated above, the most practical approach to a commercially feasible process for the production of diaryl phosphates appeared to be through the hydrolysis of a diaryl phosphorohalidate. It was obvious, though, that any process based on this reaction would require, first of all, a method to yield the phosphorohalidate in near quantitative amounts. The present art of the initial reaction between two molecular proportions of a phenol and one molecular proportion of a phosphorus oxyhalide however, gives no hint of a procedure for the quantitative placement of two aryl groups on a single phosphorus atom.

When a phosphorus oxyhalide is reacted with two molecular proportions of an alkali metal phenoxide at relatively low temperatures, no control can be exercised over the reaction, i.e. under basic conditions the quantitatively selective displacement of only two halide atoms can not be attained. For example, in a reaction involving phosphorus oxychloride and aqueous sodium cresylate in a molar ratio of 1:2, only 35% of the expected dicresyl phosphate was obtained upon hydrolysis of the dicresyl phosphorochloridate.

Strong acid conditions (0–2) are equally unfavorable. The addition of an aqueous solution of a 1:1 mixture of sodium cresylate and sodium hydroxide to 1:1 phosphorus oxychloride-cresol in benzene gave about 37% dicresyl phosphate upon hydrolysis of the phosphorchloridate.

To effect the desired extent of reaction, an alkali metal phenoxide must be present as the oxyhalide is added. The amount of phenoxide, however, must be limited to prevent basic pH's and over-reaction. The ideal condition is one in which the phenoxide is present only momentarily in the reaction medium, reacting immediately upon contact with the oxyhalide. By carrying out the reaction under conditions whereby no appreciable quantity of either reactant is present for long periods, extreme pH's (either high or low) are avoided. It has been found that proper conditions can be maintained by the separate, simultaneous addition of a phosphorus oxyhalide and an aqueous solution of an alkali metal hydroxide (the hydroxide alone or combined with phenoxide) to a phenol at a pH of 4 to 6.9 and at temperatures of from about −10° to about 20° C.

Once the halidate is obtained, hydrolysis to the diaryl phosphate is a straightforward reaction which will be evident to one in the art. Since water is already present, heat can be applied and the mixture heated at from about 45° to about 90° C. However, halogen acids are corrosive to metallic reactors, and it is expedient to use one molecular proportion of an alkali metal hydroxide as an acceptor for HX. When a hydroxide is used, addition to the diaryl phosphorochloridate is preferably started at about 40° C., the reaction pH being the same as that for the POX$_3$-phenoxide reaction. Subsequent heating to complete hydrolysis may be within the range of 45° to 90° C.

In the process of this invention, temperatures employed in the hydrolysis step are not especially critical. It was found that a temperature as low as 45° C. can be used advantageously, with the optimum range falling between 70° C. and 80° C. Times to complete the hydrolysis will vary from about one-quarter of an hour at 70° to 80° C. to from one to two hours at 45° to 50° C. Temperatures below 45° and above 80° C. can be used, but there is no advantage in doing so. Reaction times will be unreasonably long below 45° and not appreciably shortened above 80° or 90° C.

It was found that temperatures of reaction to form the diaryl phosphorochloridate in the range of −10° to 20° C. are critical with respect only to an increase in competing reactions as the temperature increases above about 10–15° C. The reaction is not otherwise affected at the high end of the range.

The following is a specific discussion of the preferred process of this invention.

The improved process of this invention is carried out by placing in a suitable reaction vessel an inert solvent and one molecular proportion of a phenol of the formula

ROH wherein R is a member of the group consisting of phenyl, lower alkoxy-substituted phenyl, alkyl-substituted phenyl wherein the alkyl group contains from 1–9 carbon atoms, halo-substituted phenyl and nitro-substituted phenyl. A molecular proportion of a phosphorus oxyhalide is placed in one dispenser and an aqueous solution containing one molecular proportion of an alkali metal hydroxide and one molecular proportion of an alkali metal phenoxide having the formula ROM, wherein M is an alkali metal and R has the same meaning as above, is placed in another dispenser. The alkali metal phenoxide in solution within the alkali metal hydroxide is prepared beforehand by mixing the ROH with an aqueous solution containing two molecular proportions of alkali metal hydroxide. A 35% solution of hydroxide is preferred for this, but in no case must the amount of water be such that the phenoxide will precipitate from solution. The phosphorus oxyhalide and the aqueous solution of phenoxide and hydroxide are added separately and simultaneously to the ROH and inert solvent at a temperature of from about −10 to about 20° C., preferably at from about 5 to about 10° C., and at a pH of from about 4 to 6.9, preferably from about 4 to 6.

After all reactants are brought together, the mixture is aged for from 5 to 15 minutes at the temperature of addition. The cooling source is removed, heat is applied and the mixture is heated to about 40° C., Hydrolysis of the diaryl phosphorochloride present in the mixture is accomplished by adding to it a third equivalent of alkali metal hydroxide in aqueous solution. The hydroxide is added while maintaining the above-mentioned pH. Since the reaction between the hydroxide and phosphorochloridate is highly exothermic, cooling will be necessary if a low hydrolysis temperature (45–50° C.) is used. When a solvent such as benzene is employed, the hydroxide can be added at a rate which can quickly carry the temperature to 75–80° C., where gentle reflux can be maintained by regulating the input of the aqueous hydroxide. Depending upon the hydrolysis temperature, it will require about 15 to 120 minutes to complete the reaction. Cooling, washing with water, separating the phases and removing the solvent completes the process. The reaction is run in the absence of any catalytic agent.

The preferred process yields a product pure enough for most commercial applications. There are, however, some impurities which may have to be removed before the product can be used in applications requiring extreme purity. The predominant product is the diaryl phosphate; the remainder is made up of varying quantities of a monoaryl phosphate, unreacted phenol, and a triaryl phosphate. These impurities can be removed from the product mixture, i.e. the mixture before the water wash discussed above, by a simple separation procedure, as follows: aqueous alkali metal hydroxide, containing only enough hydroxide to form the alkali metal salts of the mono- and di-aryl phosphates, is added to the mixture obtained from the hydrolysis step. The alkali metal phosphates thus formed are solubilized in the water, leaving the triaryl phosphate and unreacted pheonol in the solvent. The two phases are separated and the aqueous layer may be contacted with more solvent to assure complete removal of organic solvent-soluble impurities. The aqueous layer is acidified with sulfuric or other strong acid, thereby converting the alkali metal phosphates to their acid forms. Extraction of the diaryl phosphate with a solvent, leaving the monoaryl phosphate in the water layer, and removing the solvent completes the purification.

Though the preferred mode of bringing the reactants together involves the separate, simultaneous addition of a phosphorus oxyhalide and a mixture of one molecular proportion each of an alkali metal hydroxide and an alkali metal phenoxide in aqueous solution to a body of an inert solvent and one molecular proportion of a phenol, it is readily apparent that the process is not limited to this method of addition. This method appears, at present, to be the best from the sandpoint of control of temperature, pH, and undesirable side reactions. Generally, however, any method of mixing the reactants which will maintain the desired pH can be used.

Benzene was particularly useful in the practice of this invention, but it will be apparent to one skilled in this art that other solvents are useful also. As a rule, those organic solvents which are inert and which solubilize molecules predominantly aryl in character may be used. Solvent boiling point is another important factor to consider. Obviously, the less useful ones are those which have low boiling points, thereby necessitating low hydrolysis temperatures and consequent increases of reaction times. A high boiling solvent may be used if the boiling point is not sufficiently high to prevent its separation from desired product. Some other solvents having utility in the practice of this invention are chlorobenzene, toluene, and the like.

It is known that pH measurements in non-aqueous media are not absolutely translatable in terms of pH in aqueous media. Though pH readings were often erratic at the very beginning of the reaction of this invention, they always became settled as soon as a small amount of water was in contact with the reference electrodes. It is felt that the pH values found and the ranges stipulated are accurately defined in terms of an aqueous system. However, it is contemplated that they will be constructed in view of how they were measured, i.e. with a Beckman Zeromatic pH Meter and a Beckman Combination Electrode.

Having described the invention in general and specific terms, the following examples will further illustrate the invention. It has already been implied that specific modes of addition outlined are not to impose unnecessary limitations on the process. Further, the examples below are not to be construed as limitations on the scope of the process with respect to its utility in preparing other diaryl phosphates.

EXAMPLE I

Dicresyl Phosphates

Fifty-four parts (0.5 mole) of p-cresol and 44 parts of benzene were placed in a suitable reaction vessel. 54.1 parts (0.5 mole) of p-cresol and 115 parts of a 35% aqueous solution of sodium hydroxide (containing 40 parts (1.0 mole) of hydroxide) were mixed and placed in one dispenser. In another dispenser was placed 76.7 parts (0.5 mole) of phosphorus oxychloride. The two dispensers were fitted to a reaction vessel and the materials in them were added separately and simultaneously to the cresol-benzene mixture at 10° C. and at a pH of 4–6. The reaction mixture was aged for 15 minutes at 10° C. to complete formation of dicresyl phosphorochloridate, the cooling source was removed, and heat was applied to carry the temperature of the mixture to about 40° C. Fifty-seven parts of a 35% aqueous solution of sodium hydroxide (containing 20 parts (0.5 mole) hydroxide) were added at a pH of 4–6. The heat of reaction forced the temperature to 70–80° C., where it was maintained during the remainder of addition and for 15 minutes following completion of mixing the reactants.

The mixture was transferred to a wash vessel, and 150 parts of water and 229 parts of benzene were added. After agitation, the water was separated and the benzene layer was washed with three 200 part portions of water. The benzene was removed, first at atmospheric pressure and then to 100° C. at 10 mm. Hg. The weight of dicresyl phosphate thus obtained was 126.0 parts, or a yield of 90.6% based on POCl$_3$. It had the following properties:

Specific gravity $20°/4°$ C. _____ 1.214
Refractive index 26.5° C. _____ 1.5459

EXAMPLE II

Diphenyl Phosphate

The procedure of Example I was followed, using 94.1 parts (1.0 mole) of phenol, 76.7 parts (0.5 mole) of phosphorus oxychloride and 171.4 parts of a 35% aqueous solution of sodium hydroxide containing 60 parts (1.5 moles) of the hydroxide. The weight of product thus obtained was 109 parts, or a yield of 87.1%.

EXAMPLE III

Bis(2,4-Dichlorophenyl) Phosphate

The procedure of Examples I and II was followed, except that 163 parts (1 mole) of 2,4-dichlorophenol was used. Further, the 0.5 mole of 2,4-dichlorophenol to which the phosphorus oxychloride and aqueous hydroxide and phenoxide were added was dissolved in 87 parts of benzene. In the manner described, 177.9 parts of product was obtained representing a yield of 91.7%.

In addition to the above products, the improved process of this invention is useful for the preparation of numerous diaryl phosphates. The process may be used in preparing diaryl phosphates from other phenols, including nitrophenols, lower alkoxyphenols, bromo- and chlorophenols and other alkylphenols such as p-tert-butylphenol, amylphenol, octylphenol and nonylphenol, other phosphorus oxyhalides such as phosphorus oxybromide and other metal hydroxides such as lithium hydroxide and potassium hydroxide.

Among the other compounds which can be prepared by the process of this invention are the following: bis-(p-nitrophenyl) phosphate, bis(methoxyphenyl) phosphate, bis(ethoxyphenyl) phosphate, bis(butoxyphenyl) phosphate, bis(p-bromophenyl) phosphate, bis(p-chlorophenyl) phosphate, bis(p-tert-butylphenyl) phosphate, bis-(amylphenyl) phosphate, bis(octylphenyl) phosphate (where octyl may be n-octyl or a branched octyl such as 2-ethylhexyl) and bis(nonylphenyl) phosphate.

As used throughout the specification and claims, the expressions "one molecular proportion," "two molecular proportions," etc. are meant to convey only the relative amounts of reactants to be used. It is not to be inferred from them that the process is applicable to only the stated proportions. Any convenient multiple is operable if the ratio of stated proportions is maintained.

Having described the invention, what is claimed is:

1. A process for forming diaryl phosphorohalidates, in the absence of a catalyst, comprising simultaneously adding to one molecular proportion of a compound having the formula ROH wherein R is a member of the group consisting of phenyl, lower alkoxy-substituted phenyl, alkyl-substituted phenyl wherein the alkyl has from 1 to 9 carbon atoms, halo-substituted phenyl and nitro-substituted phenyl, one molecular proportion of a phosphorus oxyhalide and a mixture in aqueous solution of one molecular proportion each of an alkali metal hydroxide and an alkali metal phenoxide of the formula ROM wherein R has the same definition as above and M is an alkali metal, maintaining the temperature of the reaction mixture during the addition within the range of from about −10° C. to 20° C. while maintaining the pH of the reaction mixture from about 4.0 to 6.9 to form a major proportion of said diaryl phosphorohalidate.

2. The process as defined in claim 1 wherein the compound is run in the presence of an inert organic solvent.

3. The process of claim 1 wherein the reaction mixture is maintained within the temperature range of 5° to 10° C.

4. The process of claim 1 wherein the reaction mixture is maintained at a pH of from 4.0 to 6.0.

5. The process of claim 1 wherein the alkali metal hydroxide is sodium hydroxide.

6. The process of claim 1 in which the diaryl phosphorohalidate produced is diphenyl phosphorohalidate.

7. The process of claim 1 in which the diaryl phosphorohalidate produced is dicresyl phosphorohalidate.

8. The process of claim 1 in which the diaryl phosphorohalidate produced is bis(2,4-dichlorophenyl) phosphorohalidate.

9. The process of claim 1 wherein the diaryl phosphorohalidate formed is hydrolysed to the diaryl phosphate.

10. The process of claim 9 wherein the diaryl phosphate produced is diphenyl phosphate.

11. The process of claim 9 wherein the diaryl phosphate produced is dicresyl phosphate.

12. The process of claim 9 wherein the diaryl phosphate produced is bis(2,4-dichlorophenyl) phosphate.

13. A process for manufacturing diaryl phosphorohalidates, comprising reacting, in the absence of a catalyst, a phosphorus oxyhalide with a compound of the formula ROM, wherein R is a member selected from the group consisting of phenyl, lower alkoxy-substituted phenyl, alkyl-substituted phenyl wherein the alkyl contains from 1 to 9 carbon atoms, halo-substituted phenyl and nitro-substituted phenyl, and M is an alkali metal, the said reaction being carried out in a manner to maintain the temperature thereof within the range of $-10°$ C. to $20°$ C. and to maintain the pH thereof at from about 4.0 to about 6.9.

References Cited in the file of this patent
UNITED STATES PATENTS

| | | |
|---|---|---|
| 2,033,918 | Britton | Mar. 17, 1936 |
| 2,071,017 | Bass | Feb. 16, 1937 |
| 2,890,235 | Raley | June 9, 1959 |

OTHER REFERENCES

Kosolapoff: "Organo Phosphorus Compounds," 1950, John Wiley & Sons, Inc., New York, N.Y., page 223.